Patented May 19, 1942

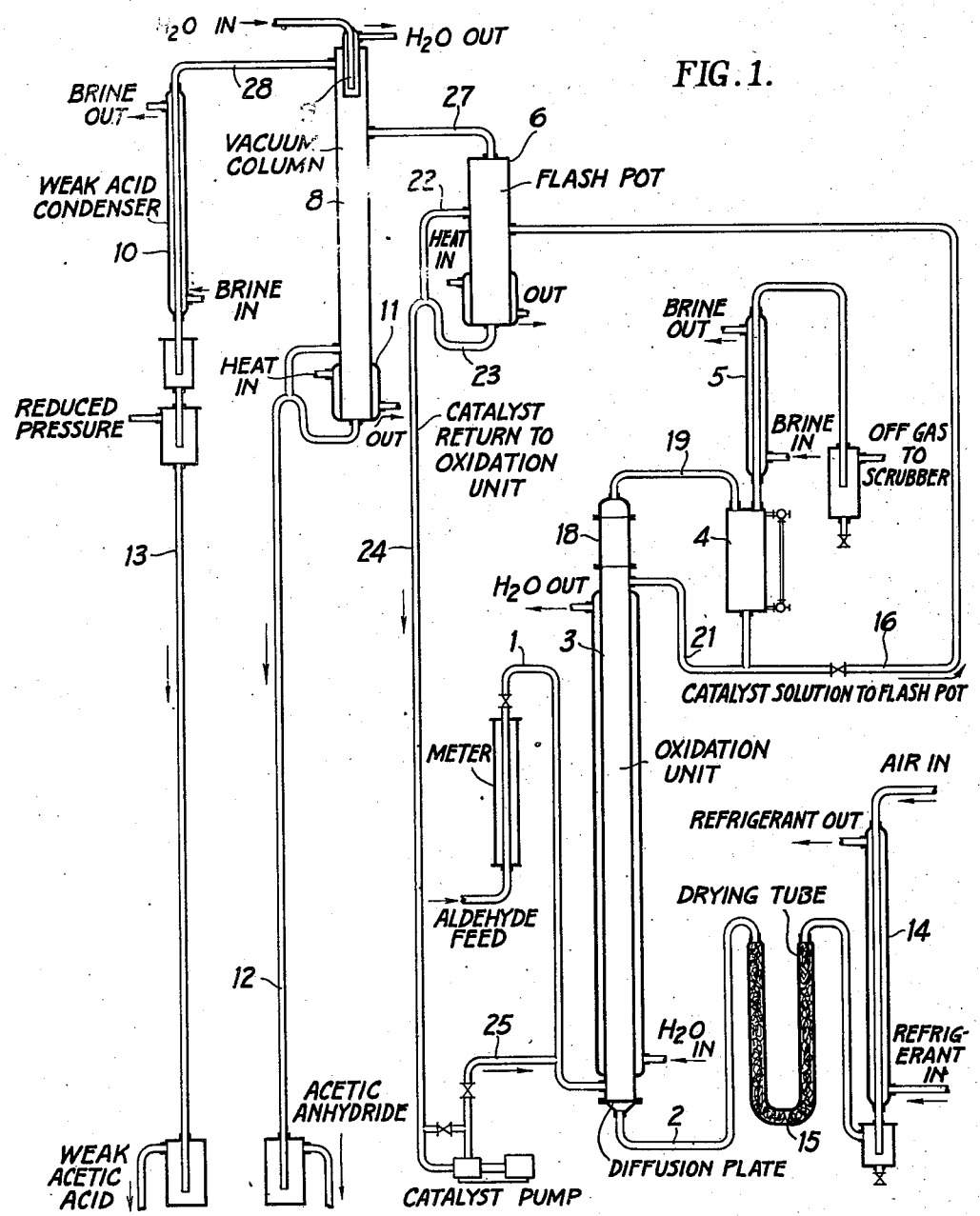

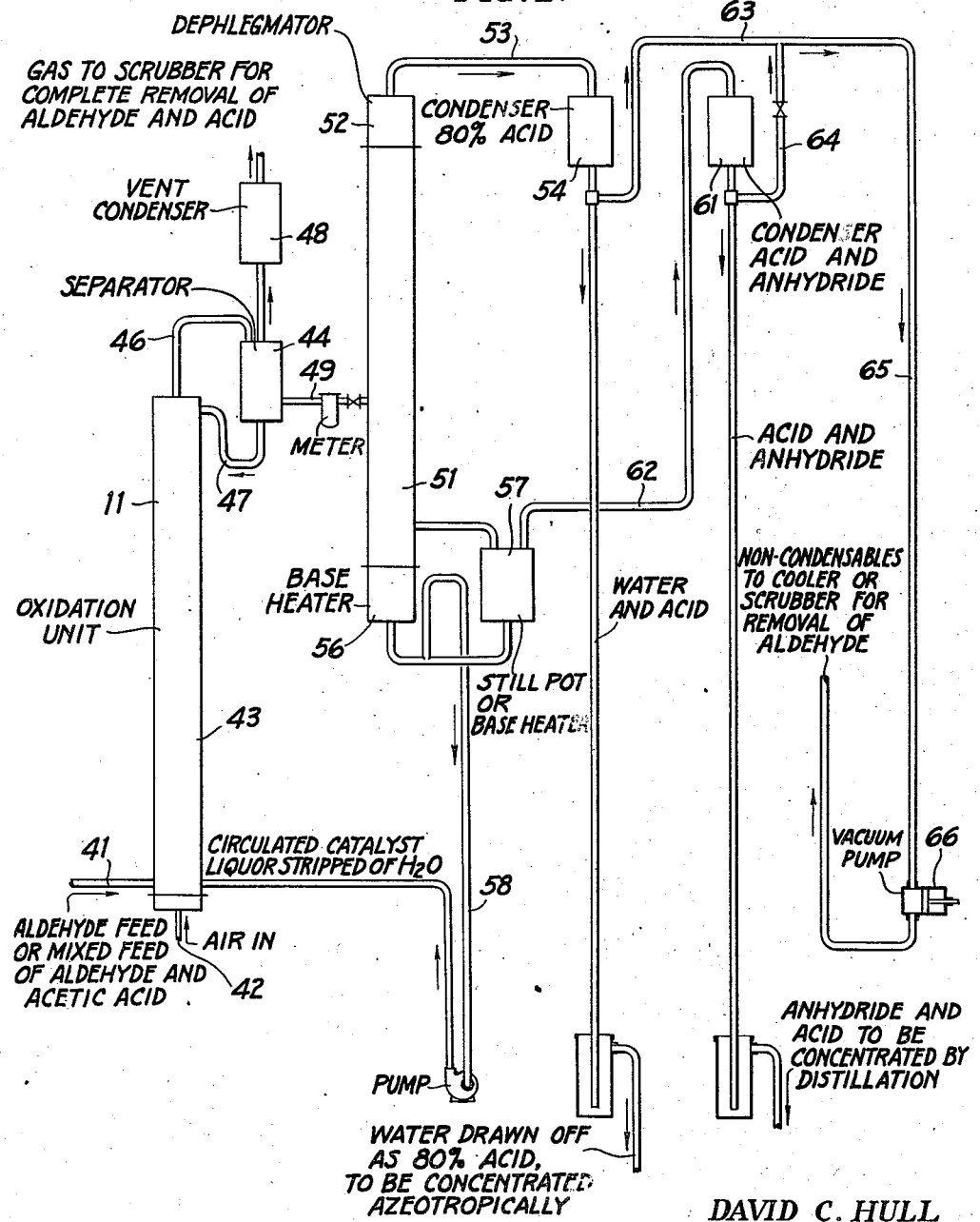

2,283,209

UNITED STATES PATENT OFFICE 2,283,209

APPARATUS FOR THE MANUFACTURE OF ORGANIC ACID ANHYDRIDES

David C. Hull and Claire A. Marshall, Kingsport, Tenn., assignors to Eastman Kodak Company, Rochester, N. Y., a corporation of New Jersey Application May 18, 1939, Serial No. 274,426

6 Claims. (Cl. 23—260)

This invention relates to the manufacture of anhydrides of aliphatic acids and more particularly to apparatus and catalyst for the manufacture of acetic anhydride.

This application is a continuation-in-part of our copending U. S. application S. N. 139,522.

As is well-known, large quantities of organic acid anhydrides are employed in the industry. For example, in the manufacture of various plastics, synthetic silks, and other such products, there are employed large quantities of such anhydrides. One usual way for manufacturing such anhydrides is to first prepare or obtain the corresponding acid and then convert the acid into a dehydrated product such as the anhydride or ketene which may be readily transformed to the anhydride. Other processes are directed to the conversion of acetone and the like into anhydrides.

We have found that the aforementioned type of more or less indirect methods for manufacturing anhydrides are unnecessary and that such anhydrides may be produced more directly as will be described in detail hereinafter.

The invention has for one object to provide novel apparatus for use in a process for the manufacture of aliphatic acid anhydrides which is substantially continuous and direct. Still another object is to provide apparatus for an oxidation process for the production of anhydride of the lower aliphatic acids. A still further object is to provide an apparatus set-up for catalytic oxidation which includes means for the recovery of the organic acid anhydrides produced. Another object is to provide apparatus which is particularly useful for converting aldehydes substantially directly to organic acid anhydrides.

Still another object is to provide a novel catalyst solution that is particularly useful for the treatment of aliphatic aldehydes. Still another object is to provide a catalyst solution essentially comprising salts of eighth group metals from the periodic system, which solution may be employed in various ways without the generation of dangerous quantities of peracetic acid. Still another object is to provide a catalyst solution which exerts a minimum of decomposition reaction on acetic anhydride.

Still another object is to provide a novel method of manufacturing catalyst solution containing nickel salts and cobalt salts. A still further object is to provide a process of treating catalyst solutions containing nickel salts and cobalt salts to increase their activity. Other objects will appear hereinafter.

For a more complete understanding of our invention reference is made to the attached drawings. Fig. 1 is a semi-diagrammatic side elevation view in the nature of a flow sheet showing one type of apparatus arrangement which may be employed for carrying out our process.

Fig. 2 is another side elevation view of a diagrammatic lay-out of apparatus for carrying out a modified type of process.

In Fig. 1, the numeral 1 indicates a feed conduit for the aldehyde to be converted. This conduit is connected to an oxidation unit or column 3. The column may be of various constructions and jacketed for controlling the temperature therein. The upper portion of the column may be provided with temperature controlling unit designated 18. The upper portion of the unit is connected through the conduit 19 to separator 4. Separator 4 is provided with a condenser conduit means 5 for separating unconsumed and uncondensible gases as will be described hereinafter. Separator 4 is also provided with return conduit 21 to the column. The lower portion of the column 3 is provided with another feed inlet 2 for oxidizing medium. While we show a plurality of feed inlets, we also contemplate the use of a single conduit and premixing. Conduit 2 may be connected to drying apparatus 15 and a condenser 14 for the purpose of drying the oxidizing medium.

Referring again to the upper portion of the oxidation equipment, a valved conduit 16 interconnects the oxidation equipment with the flash pot 6. This flash pot may be constructed similar to any conventional still pot or base heater. The lower and intermediate sections of the flash pot are also interconnected by means of conduits 22, 23, 24 and 25, so as to provide return to the oxidation unit. The flash pot is also connected by means of conduit 27 to vacuum column 8. This column may be of any standard construction but preferably will be of a type which facilitates the application of reduced pressure thereto. The lower portion thereof will be provided with heating means 11 and a draw-off means 12. The upper portion of the column 8 is provided with a dephlegmator or condenser means 9. The upper portion is also provided with a draw-off conduit 28 through which materials may be removed and condensed at 10 and further withdrawn at conduit 13. The reduced pressure producing equipment (not shown) may be attached to the unit at some point along this line.

Fig. 2 is in a number of respects similar to Fig. 1. Suitable feed conduits are provided at 41 and 42. An oxidation unit of any of the aforementioned types already described, having a diffusing disk, or nipples in the base, and cooling coils within the unit, is provided at 43. The upper portion of the unit is connected to separator 44 by means of conduits 46 and 47. Means for removing gaseous components is provided at 48. The separator 44 is connected by valved conduit 49 to a vacuum still 51, packed with Raschig rings. This column is provided with dephlegmator 52 in the upper portion thereof and vapor off-take conduit 53, which leads through condenser 54 as an acid-cooling means. The lower portion of still 51 is provided and interconnected with a base heater 56 and a still pot 57. These units are also connected by conduit 58 to the oxidation unit. The still pot is connected by means of conduit 62 through a condenser 61 to anhydride and acid collecting receivers. The several parts aforementioned are interconnected by conduits 62, 63, 64 and 65 to a vacuum equipment designated 66.

In the above described apparatus lay-outs it is to be understood that suitable meters, thermometers and other control equipment may be inserted where desired. Preferably, the oxidation equipment is to be constructed of aluminum or aluminum alloys. However, other materials and alloys may be employed. If desired, the various equipment or parts thereof may be constructed of iron or various types of stainless steel.

The functioning of our novel apparatus will be apparent from the following description wherein several examples of processes which may be carried out therein are described.

After considerable investigation of oxidation procedure and related procedure, we have found that anhydride may be directly formed by oxidizing aldehydes and that the anhydrides, though reactive under normal conditions, by our novel procedure may be continuously recovered to a substantial extent and that the resulting oxidation mixture containing the desired anhydride may be substantially continuously obtained by our novel practices described herein. While, as indicated, there is a marked tendency of anhydrides to react with water and form acids, which rate of reaction is quite rapid under normal atmospheric conditions, we have found that this rate of reaction is considerably diminished under other conditions; hence, by our continuous process we are able to overcome to some extent and delay the undesired reactions of the anhydride and thereby are able to recover substantial amounts of the anhydride which we have produced.

While in the following description we have set forth teachings relative to two carbon atom aldehydes such as acetaldehyde, it is to be understood that apparatus and catalyst may be employed with three and four carbon atom aldehydes such as propionic and butyric aldehydes or mixtures either gaseous or liquid, containing at least one of these aldehydes such as, for example, hydrocarbon gases containing a content of acetaldehyde.

An oxidation unit is filled with catalyst solution. We prefer to employ a catalyst solution containing certain ingredients in certain proportions. We have found that a catalyst solution for best conversion of aldehyde to anhydride should contain greater than 2% cobalt salt, as for example a quantity within the range of 2-6% cobalt salt. We have found, however, that still increased production may be obtained by including in the composition an addition of nickel salt. Too high percentages of nickel salt, however, possess certain disadvantages in causing reactions which produce loss of product and give an uneven operation.

We have found that the nickel salt should be below about 2% and the cobalt salt above 2%. Various nickel and cobalt salts may be employed and generally a salt would be used corresponding to the compound being produced in the process employing the catalyst. That is, in a process of producing acetic anhydride a small amount of nickel acetate in acetic acid solution with, for example, 3½% of cobaltic acetate would be employed. This solution might also contain acetic anhydride. We have expressed our catalyst concentration in weight percent of the catalyst mixture. It will be observed as the description proceeds that in our apparatus the composition of our mixture is maintained substantially constant because the composition and quantity of the catalyst solution in our apparatus do not materially change, since the added ingredients and reaction products are not allowed to build up therein.

In some instance, particularly where the catalyst solution has a low content of water (less than 5%) or is anhydrous, and/or a content of anhydride a percent up to 12% nickel salts in any combination with up to 20% cobalt salts may be employed.

We have found that our catalyst solution composed of the two salts in combination as described will produce yields as high as 45% on the basis of anhydride obtained and 92%-95% or better with respect to the aldehyde converted.

We have also found that our novel catalyst comprising a certain proportion of nickel salt in solution with a certain proportion of cobalt salt functions very well as relatively low temperatures of operation, as for example, between 0° and 30° C. Even at these temperatures various aldehydes may be readily converted to anhydride by oxidation and the catalyst solution completely changed or circulated from the oxidation unit completely, for example, every few hours, but generally at least once during any twenty-four hour period. The catalyst is preferably withdrawn from the oxidation unit to the vacuum still sufficiently often so that the water content thereof is always maintained below about 10%-15%.

In preparing our novel catalyst, we would preferably incorporate a cobalt salt as for example a cobalt oxide, acetate or the like, in an amount to obtain a 2-8% solution (by weight) in a 2-5 carbon atom lower aliphatic acid. Thereafter, air, oxygen, or other oxidizing medium in combination with a 2-5 carbon atom aliphatic aldehyde would be passed through the solution until a color change occurred. Thereafter, the nickel salt such as the acetate, oxide or the like would be added and the passage of the oxidizing medium and aldehyde continued for a short time. The catalyst may then be employed for oxidation procedure and will be found to possess a high degree of activity. In addition, in the particular catalyst solution employed in our novel processes herein described, we also contemplate the addition of the corresponding organic acid anhydride thereto. That is, in the instance of acetaldehyde oxidation, our catalyst solution would preferably contain a content of acetic anhydride.

The aldehyde to be oxidized may be fed in either the liquid or vapor phase through single conduits or pre-mixed with the oxidizing medium. If desired, pressure can be applied to the oxidation step but we prefer to employ only about sufficient pressure to overcome the hydrostatic pressure of the catalyst solution. Or, if desired, reduced pressure can be employed for assisting or overcoming the hydrostatic pressure or resistance, the catalyst solution may offer to the passage of the aldehyde therethrough The oxidizing medium may comprise air, ozone or other materials including free and active oxygen, preferably supplied in some excess, that is, so that a content of oxidizing medium is found beyond the reaction zone By oxidation in our novel apparatus of the aldehyde in the presence of the novel catalyst solution described anhydride is formed, but as previously indicated, it is necessary to prevent further reaction thereof. By our apparatus arrangement for the continuous removing of the anhydride from the catalyst solution we are able to recover at least a substantial part of the formed anhydride. That is, the solution from the oxidation of acetaldehyde which contains acetic anhydride, acetic acid, catalyst and some water, together with off-gases, is subjected to separation and reduced pressure. We have found this materially delays further reaction of the anhydride. The solution is then treated to remove acetic acid and water. Any acid in the anhydride may be readily separated therefrom. A certain amount of the withdrawn acetic acid, together with some anhydride is preferably returned to the oxidation unit for keeping the solution in the oxidation unit more or less at a constant level and of a composition that does not vary to too great an extent.

Should iron equipment be employed and a high content of $CO_2$ be indicated in the off-gases, thereby evidencing that a part of the materials are being over-oxidized, the addition of a phosphate, or other iron precipitant to the catalyst solution, will impart an improvement thereto.

The anhydride produced may be further concentrated and employed for any of the desired purposes such as in the manufacture of cellulose esters and the like. The organic acid produced in conjunction with the production of anhydride may be further concentrated to a completely anhydrous acid and returned to the catalyst solution or the anhydrous acid may be converted by pyrolysis to ketene or anhydrides.

A still further understanding of our process may be obtained by the consideration of the following examples which are set forth to illustrate our preferred embodiment. In consideration of the first example, reference is made to Fig. 1 of the drawings:

*Example I.*—Acetaldehyde is fed in through conduit 1 to oxidation column 3 which contains as a catalyst, nickel acetate cobalt acetate in acetic acid, acetic anhydride and water as already described in detail. Through this solution a stream of air, dried by passing through cooler 14 and calcium chloride dryer 15, is passed in through conduit 2. If desired, the oxidizing medium may be completely dried merely by the application of refrigeration thereto to cause a chilling out of moisture from the oxidizing medium, or drying means alone may be employed. The temperature of the catalyst solution is preferably maintained at 30° C.–35° C. by a stream of cooling medium as water through the jacket of 3. The nitrogen left from the oxidation process together with a slight excess of oxygen is carried out through separator 4 to reflux condenser 5 and then to a scrubber for removal of traces of acid and aldehyde. That is, any of the aldehydes or acids which may be removed, due to entrainment in the oxidizing medium are preferably removed by some suitable treatment. As the liquid formed in the oxidation process builds up in separator 4 it is drawn up by vacuum to flash pot 6. A portion is here flashed off to vacuum column 8. The excess liquid overflows from 6 through conduits 22, 23, 24 and 25 back into column 3. The rate of circulation may be regulated by a valve in conduit 16 and the rate can be varied but preferred operation seems to be at such a rate that the catalyst in column 3 be changed at least once in a fraction of an hour. While changing the catalyst solution every few minutes keeps the catalyst solution in its highest state of efficiency, since undesired constituents as water are eliminated, it is possible to change the catalyst solution at greater intervals as for example every several hours. In general, we would always completely change the catalyst solution once in every twenty-four hours. Inasmuch as our catalyst solution is substantially continuously conducted to a heating unit wherein the water, aqueous acetic acid and other constituents which would decompose the anhydride formed are eliminated and the improved catalyst solution returned to the oxidation unit, it is apparent that our catalyst solution may be substantially continuously maintained in a high state of efficiency. A meter can be used in the line from 4 to 6 to control this flow. The amount of vapors flashed from 6 to vacuum still 8 is such that the level in 4 remains substantially constant; the vapors consist of acid, water and anhydride. Here the water is removed through dephlegmator 9 to condenser 10 along with a quantity of acid, this water-acid mixture is drawn off through a barometric leg 13 overflowing from a sealed vessel as shown. From the base of still 8 through base heater 11, which supplies the heat necessary for the distillation, the mixture of acid and anhydride overflows through a barometric leg 12 and overflows from a sealed vessel as shown. Oxidation column 3 can be operated at either increase, normal or reduced pressures.

For example, a total of 37 lbs. of acetaldehyde were fed into oxidation column 3, which was maintained at 30° C.–35° C. During this time 24.5 lbs. of 30% acetic anhydride were collected from overflow 12 and 11 lbs. of 86% acetic acid (2% aldehyde and 12% water) were removed from overflow 13, while the scrubber water from the nitrogen scrubber and discharge from the vacuum pumps contained an addition 2.7 lbs. of aldehyde and 6.2 lbs. of acid. By reducing the quantity of aldehyde fed into column 3 the per cent conversion can be increased while by decreasing the per cent acid drawn off from column 8, by increasing the reflux from dephlegmator 9, the per cent aldehyde recovered in the form of anhydride is increased. During the operation the pressure in column 8 is maintaind at about 40° mm. absolute at the top, the temperature of vapors at 9 is about 18–20° C., the liquid at 11 is 45° C.–48° C., while the liquid in flash pot 6 is held at about 38° C.–42° C.

In a similar manner propionaldehyde, butyraldehyde or other aldehydes may be used to produce their corresponding anhydrides.

In respect to Fig. 2, a similar type of process as already described in detail may be carried out. The oxidation would be the same. However, when operating in accordance with Fig. 2, the entire catalyst solution may be striped principally of water, acid and some acetic anhydride and then the solution returned to the oxidation unit. Also, in accordance with Fig. 2 the procedure for recovering the anhydride is carried out in the adjacent still pot 57. That is, as an anhydride-acid mixture collects in 56, part thereof flows into still pot 57 where anhydride and acid in an amount substantially equivalent to that formed is distilled off through conduit 62 and condensed at 61. A portion of the catalyst solution is circulated therethrough in accordance with Fig. 2. Or, the catalyst or catalyst solution may be circulated through a flash pot where only an amount equivalent to the increase in volume of the oxidation unit is flashed off to the water removal column and the rest is returned to the base of the oxidation unit as shown in Fig. 1. In another method of operation, a great quantity of liquid may be flashed off from the flash pot while the level in the oxidation unit is maintained either by returning a portion of the water-free acetic anhydride overflowing from the base of the water removing column or by the addition of glacial acid or other liquid to the oxidation unit. By improved control of vacuum still 8, even higher anhydride yields may be obtained.

In the embodiments we have shown, the reduced pressure does not carry through to the oxidation unit. It will be noted that a throttling valve if provided in the connecting conduit, isolates the vacuum still from the oxidation unit as far as pressure is concerned. In the instance of oxidizing acetaldehyde by means of air or in the presence of a diluent, due to the acetic acid and anhydride having a higher volatility than, for example, propionic acid and anhydride, that when operating around about 60–70° C. without any flashing devices, the air mixtures passing through the unit will carry out the acetic acid and anhydride as fast as they are formed. The carried out materials may then be subjected to treatment for separating the anhydride therefrom. It will also be noted that we do not have to drastically cool the anhydride acid-water catalyst mixture but that these components may be more or less treated in a heated condition or at the temperatures which they are evolved from the oxidation step. Our process is preferably operated in a continuous manner as already indicated and in this respect possess considerable advantage. By such procedure the anhydride formed is separated from detrimental components within a very short time after it is formed.

In our continuous process we are able to oxidize 85%–90% of the aldehyde feed, in a single pass. This, of course, considerably simplifies aldehyde separation, recovery, recirculation, etc.

From the foregoing it is apparent that our invention is susceptible of modification, hence, we do not wish to be restricted except insofar as necessitated by the prior art and the spirit of the appended claims.

What we claim is:

1. A combination oxidation-vacuum distillation apparatus which comprises an elongated closed-chamber, closed excepting for the hereinafter defined conduits connected to said chamber, temperature controlling means in close association with substantially the entire length of said chamber, a withdrawal conduit connecting the upper part of said chamber to a separator positioned at a height approximately the same as the height of the upper portion of said chamber, said separator having attached thereto a sight glass and a condenser, a return conduit connecting the separator to a lower point in said elongated closed-chamber, conduit means connecting said separator to a flash pot in series with and connected to a closed vacuum distillation column, both the flash pot and column having associated with the lower portion thereof indirect heating means so that the heating medium cannot become intermixed with the contents being heated, a conduit leading from the upper part of said vacuum distillation column through a condenser to a trap, a further conduit means adapted for applying reduced pressure connected to the trap, another conduit leading from the lower part of said vacuum distillation column through trap means, and at least one conduit leading from said flash pot back to the lower part of said elongated closed-chamber, and a plurality of inlet conduits also connected to the lower part of said chamber, at least one of said inlet conduits having in series therewith refrigerated cooling means.

2. A combination oxidation-vacuum distillation apparatus which comprises an elongated chamber adapted to contain acidic-liquid therein, temperature controlling means in close association with substantially the major part of the length of said chamber, a conduit connecting the upper part of said chamber to the upper part of a separator positioned adjacent the upper portion of said chamber, said separator having attached thereto condenser means, another conduit connecting the lower part of the separator to another point in said elongated chamber, conduit means connecting said separator to a flash pot in series with and connected to a closed vacuum distillation column, indirect heating means attached to both the flash pot and column so that the heating medium cannot become intermixed with the contents undergoing heating, a conduit leading from the upper part of said vacuum distillation column through a condenser to trap means, means connected to the trap adapted for applying reduced pressure thereto, another conduit leading from the lower part of said vacuum distillation column through trap means whereby contents may be withdrawn therefrom without dissipation of said reduced pressure, at least one conduit leading from said flash pot back to the lower part of said elongated chamber, and a plurality of inlet conduits also connected to the lower part of said chamber.

3. A combination oxidation-vacuum distillation apparatus which comprises an elongated chamber, temperature controlling means in close association with substantially the entire length of said chamber, conduit means connecting said chamber to a separator unit positioned adjacent said chamber, said separator having attached thereto condenser means, other conduit means connecting the separator to another point of said chamber, conduit means connecting said separator to a closed vacuum distillation system provided with indirect heating means so that the heating medium cannot become intermixed with the contents undergoing distillation, a conduit leading from the upper part of said column through a condenser to a trap, conduit means connecting a point beyond said last-mentioned condenser to a vacuum pump, other conduit means leading from the lower part of said vacuum column, at least one conduit leading from said vacuum distillation system back to the lower part of said elongated chamber, and a plurality of inlet conduits also connected to the lower part of said chamber.

4. A combination oxidation-vacuum distillation apparatus which comprises an elongated closed-chamber, temperature controlling means in close association with the major part of the length of said chamber, conduit means connecting the upper part of said chamber to a separator unit positioned adjacent the upper portion of said chamber, said separator having attached thereto sight glass means and condenser means, a return conduit connecting the separator back to another point of said closed chamber, conduits connecting said separator to a closed vacuum distillation system, including a distillation column, in series with said separator, said column being provided with indirect heating means so that the heating medium cannot become intermixed with the contents undergoing distillation, a conduit leading from the upper part of said column through a condenser to a vacuum pump, other conduit means leading from the lower part of said distillation column through trap means, at least one conduit leading from said vacuum distillation system back to the lower part of said closed-chamber, and a plurality of inlet conduits also connected to the lower part of said chamber.

5. An apparatus which comprises an elongated closed, acid-resistant oxidation chamber, temperature controlling means in substantially continuous close association with the major part of the length of said chamber, a separator provided with a condenser attached to the upper part thereof positioned intermediate of said oxidation chamber and a vacuum distillation system, said vacuum distillation system being provided with a plurality of base heaters having indirect heating means, at least one conduit connecting a base heater with the lower part of said oxidation chamber, and a plurality of draw-off conduits leading from the vacuum distillation system through trap means, at least one of the conduits being connected with a vacuum pump.

6. An interconnected oxidation-vacuum distillation apparatus which comprises an elongated closed-chamber of substantially uniform diameter, closed excepting for the hereinafter defined conduits connected to said chamber, temperature controlling means in substantially continuous close association with the major part of the entire length of said chamber, conduit means connecting the upper part of said chamber to a separator positioned intermediate said chamber and a vacuum distillation system, said separator having attached thereto condenser means, conduits connecting the separator to another point of said closed-chamber, still further conduits connecting said separator to said vacuum distillation system which includes a closed vacuum distillation column, said column being provided with indirect heating means so that the heating medium cannot become intermixed with the contents undergoing vacuum distillation, a conduit leading from the upper part of said column through a condenser to means for applying reduced pressure thereto, other conduit means leading from the lower part of said vacuum distillation column, at least one conduit leading from said vacuum distillation system back to the lower part of said elongated closed-chamber, and a plurality of inlet conduits also connected to the lower part of said chamber.

DAVID C. HULL.
CLAIRE A. MARSHALL.